United States Patent [19]

Pondman

[11] 4,306,696
[45] Dec. 22, 1981

[54] DISCONNECTIBLE SUSPENSION BOW

[75] Inventor: Willem Pondman, The Hague, Netherlands

[73] Assignee: Flamco B.V., Gouda, Netherlands

[21] Appl. No.: 141,930

[22] Filed: Apr. 21, 1980

[51] Int. Cl.³ ............................ E21F 17/02; F16L 3/00
[52] U.S. Cl. .......................................... 248/59; 248/62
[58] Field of Search .................... 248/62, 59, 58, 60, 248/327; 24/23 B

[56] References Cited

U.S. PATENT DOCUMENTS

| 476,227 | 5/1892 | Dunning | 248/62 X |
| 802,087 | 10/1905 | Robinson | 248/59 |
| 1,924,353 | 8/1933 | Fitzpatrick | 248/59 |

FOREIGN PATENT DOCUMENTS

| 1235665 | 5/1960 | France | 248/59 |
| 7309373 | 1/1975 | Netherlands | 248/59 |

Primary Examiner—J. Franklin Foss
Attorney, Agent, or Firm—Watson, Cole, Grindle & Watson

[57] ABSTRACT

A disconnectible suspension bow for fastening a pipe, a cable or a similar longitudinal object, to a supporting structure, consists of a composite rod-shaped unit, the upper end of which is provided with fastening means for the supporting structure, while its lower end carries a circular element.

Said rod-shaped unit is adjustably connected with both the fastening means and the circular element, through an allsided pivotal coupling.

2 Claims, 4 Drawing Figures

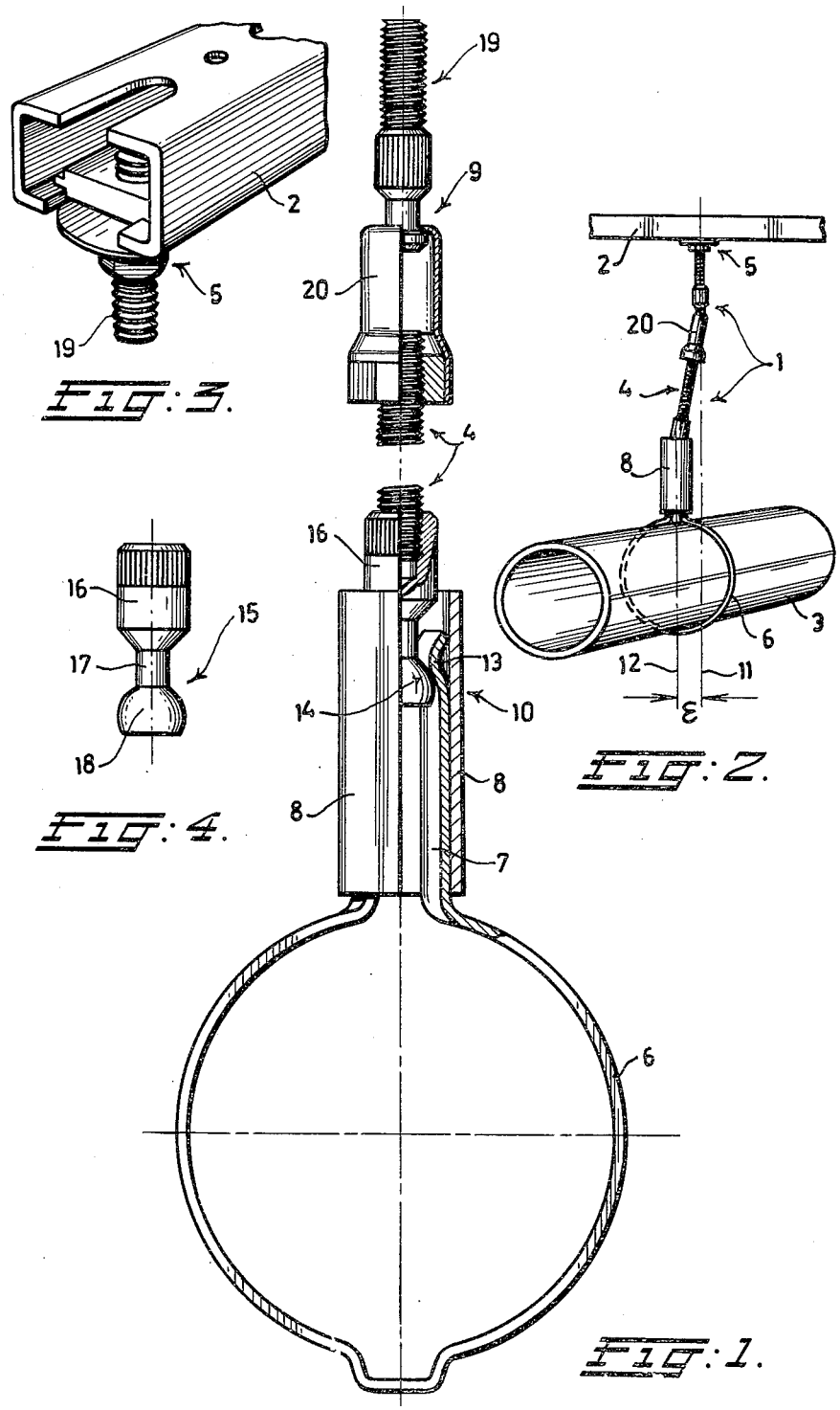

4,306,696

DISCONNECTIBLE SUSPENSION BOW

BACKGROUND OF THE INVENTION

1. Field of the Invention

The present invention relates to a disconnectible suspension bow for fastening a pipe, a cable or a similar longitudinal object to a supporting structure, the suspension bow being made up of a composite rod-shaped unit, the upper end of which is provided with fastening means for the supporting structure, and the lower end carries a circular element.

2. Description of the Prior Art

In the prior art, suspension bows have been used in various embodiments. The object thereof is to provide a rapidly and easily mountable structure on the one hand, and to obtain a sufficient strength for taking up the weight of the object to be suspended, on the other hand.

The difficulty with these prior art embodiments, however, is that the mounting is carried out in two steps. First, the object (pipe) is suspended provisionally, whereupon, for example, the screw-threaded rod is fastened. In the second step the bow is put around the pipe; for fastening this bow to the rod, the combination of object plus bow is moved up and down due to the fact that the majority of the bows must be pushed along the rod, starting from the free end of the rod.

Another difficulty of the prior art bows, consists in that after a complete or partial mounting of a number of suspension bows, there frequently occurs a slight displacement as a result of mechanical or thermal causes in the object supported, which may give rise to bending stresses or permanent deformations of the suspension bows.

SUMMARY OF THE INVENTION

In view of the foregoing factors and conditions of the prior art it is a primary object of the present invention to provide a suspension bow the supporting structure of which may be fastened to the ceiling, while only then the respective pipe is so arranged that the latter is supported at once in its desired position.

It is another object of the present invention to provide a structure which, while maintaining the above mentioned advantages, simultaneously precludes the drawbacks of the prior art structures.

This is attained according to the present invention in that the rod-shaped unit is connected in an adjustable manner with both the fastening means and the circular element through a universal pivotal coupling.

As a result of these measures, slight displacements or deformations of the suspended object will be absorbed without tensile forces occurring in the suspension structure.

In a preferred embodiment of the present invention, the circular element of the suspension bow is provided with two radially protruding tongues adjacent to either side of the rod-shaped unit, which are affixed by a sleeve being slideable with clearance around the circular element, said sleeve closely fitting around the two tongues. In this embodiment, the tongues comprise a recess the end of which is directed toward the rod-shaped element, that element comprising a spherical thickening at that point. This allows a slight angular displacement between the rod-shaped unit, and the circular element co-operating with the object to be suspended.

The features of the present invention which are believed to be novel are set forth with particularity in the appended claims.

Other claims and many of the attendant advantages will be more readily appreciated as the same becomes better understood by reference to the following detailed description considered in connection with the accompanying drawings in which like reference symbols designate like parts throughout the figures.

DESCRIPTION OF THE DRAWINGS

FIG. 1 is a vertical view, partly in cross-section, of the complete suspension bow;

FIG. 2 shows, on a reduced scale, the results which may be obtained with this suspension bow;

FIG. 3 is an example of fastening the upper portion of the suspension bow in a supporting rail;

FIG. 4 is a loose portion of the pivotal coupling in the lower part of the suspension bow.

DESCRIPTION OF A PREFERRED EMBODIMENT

In order to best understand the present invention a description of a preferred embodiment thereof is provided accompanied by drawings.

Initially referring to FIG. 2, the disconnectible suspension bow 1 is intended for fastening a pipe 3 or a similar longitudinal object to a supporting structure 2. The suspension bow is made up of a composite rod-shaped unit 4 which is illustrated in FIG. 1. At the upper end, this unit 4 is provided with fastening means 5 (see FIG. 3) for the supporting structure 2. At the lower end, the unit 4 comprises a circular element 6. This element is provided with two radially protruding tongues 7 which are adjacent to both sides of the rod-shaped unit 4. The tongues are held by a sleeve 8, being slideable with clearance along this unit 4 and closely fitting around both tongues 7.

Referring now to FIG. 1, the rod-shaped unit 4 is connected through universal pivotal coupling 9, with the fastening means 5 and, through universal pivotal coupling 10, also with the circular element 6. The effect of these two universal couplings 9, 10 is illustrated (slightly exaggerated for the sake of clearness) in FIG. 2. After a provisional mounting, the pipe 3 may be submitted to a slight displacement, which displacement may be absorbed by the suspension bow 1 without additional tensions being brought about in the element 6 or in the rod-shaped unit 4. The centerline 11 in FIG. 2 shows the purely vertical suspension, while the centerline 12 shows that a certain displacement may occur without inconvenience.

The pivotal coupling 10 has been obtained in that near their ends, the tongues 7 comprise a recess 13 being directed toward the rod-shaped unit 4 having a spherical thickening 14 at that point. This thickening constitutes part of a branch piece 15 (see FIG. 4) which is screwed to the lower end of the rod-shaped unit 4. This branch piece 15 consecutively comprises a nut-shaped portion 16, a groove or a narrow zone 17 and a spherical portion 18. The sleeve 8 may easily be slid upward so as to release the circular element, while during the mounting of the suspension bow, a downward movement of the sleeve 8 results in a certain enclosure with the tongues 7, the recess 13 of which is kept in contact with the spherical thickening 14.

Universal pivotal coupling 9 is composed of two parts comprising a stud 19 and a cap nut 20 movably coupled therewith, this cap nut being screwed upon the rod-shaped unit 4.

It will be clear that the suspension bow 1 is composed of a number of parts which, in mounted position, allow a certain movement by means of which the elevational adjustment of the circular element 6 may be obtained. The stud 19 may be fastened more or less deep into the supporting structure 2, while the rod-shaped unit 4 may be screwed more or less deep into the cap nut 20. The clearance between the sleeve 8 and the nut-shaped portion 16 of the branch piece 15, in combination with the coupling 9, provides a certain displaceability (see FIG. 2). Morever, a provisional support of the pipe 3 during the mounting of the supporting structure now has become superfluous.

I claim:

1. A disconnectible suspension bow for fastening a pipe, a cable or a similar longitudinal object to a supporting structure, comprising:

a composite rod-shaped unit, the upper end thereof is adjustably connected with fastening means for engagement with the supporting structure, and the lower end thereof carries a branch piece screwed thereupon, said branch piece consecutively consisting of a nut-shaped end, a neck portion and a spherically thickened portion adapted to retain a circular element encompassing the longitudinal object, said circular element is provided with radially protruding tongues, each extending along a side of the spherically thickened portion, said tongues being locked by a sleeve slideable along said rod-shaped unit closely fitting around said tongues, each tongue comprising near the free end thereof a recess engaging with said spherically thickened portion.

2. A disconnectible suspension bow as claimed in claim 1, wherein the fastening means at the upper end of the rod-shaped unit is composed of two parts consisting of a stud and a cap nut movably coupled thereto, which is screwed upon the upper end of the rod-shaped unit.

* * * * *